Patented July 9, 1940

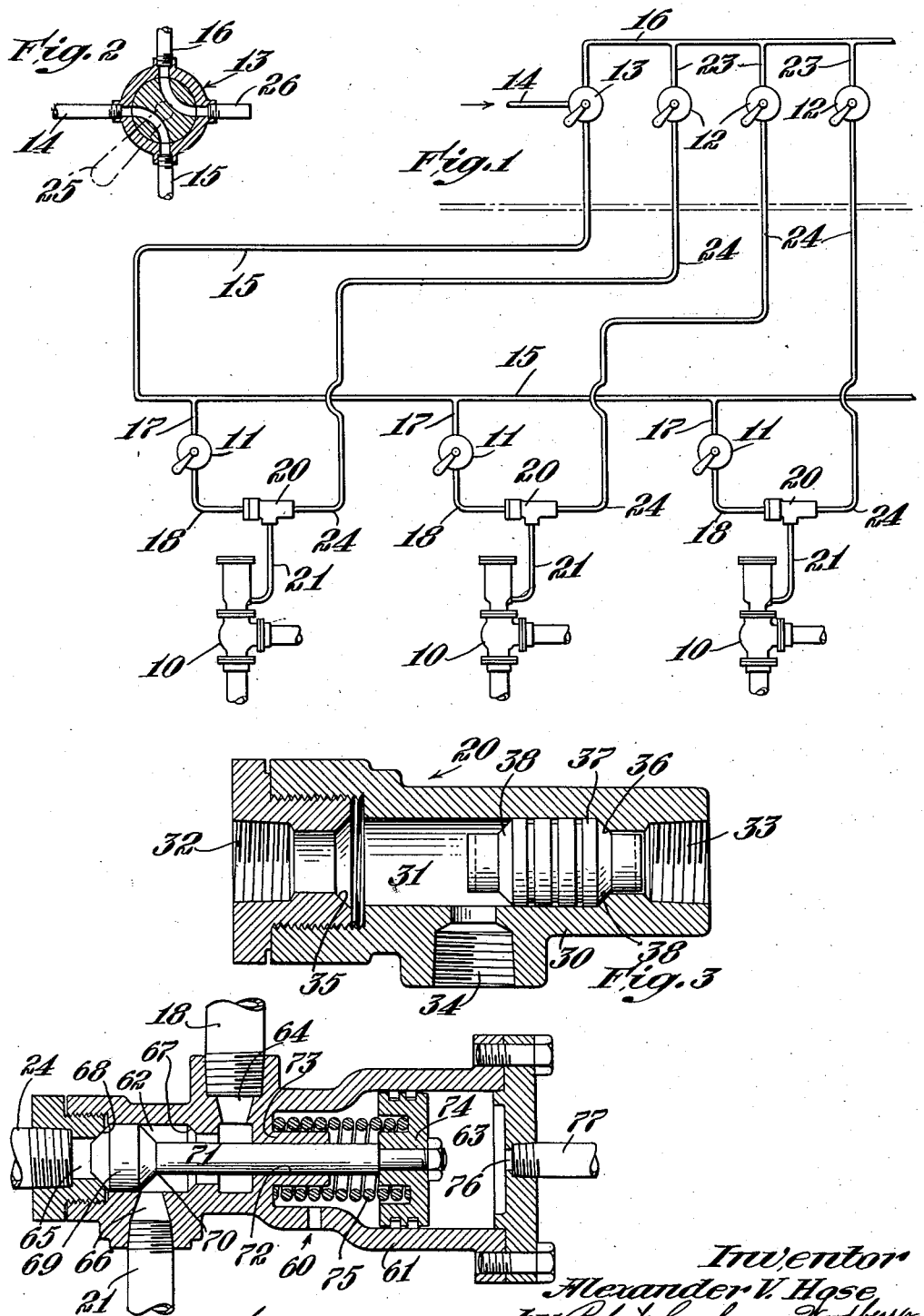

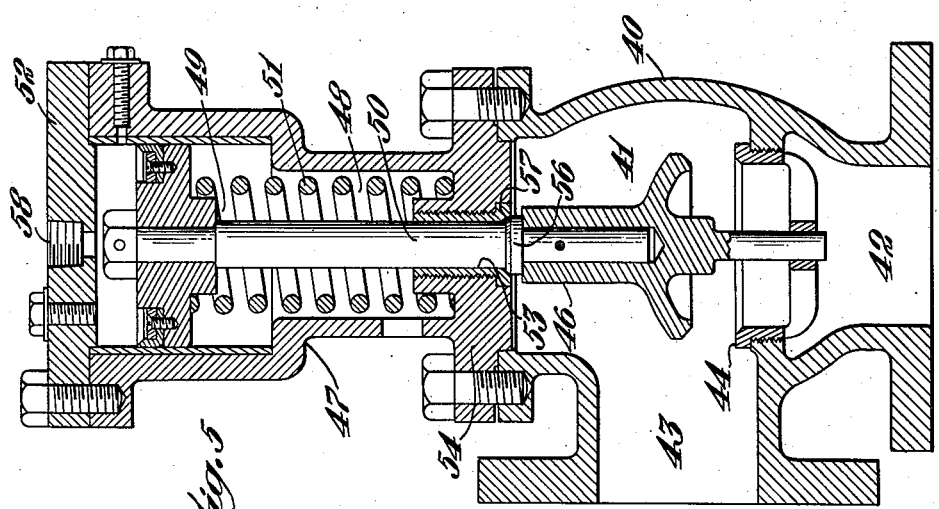
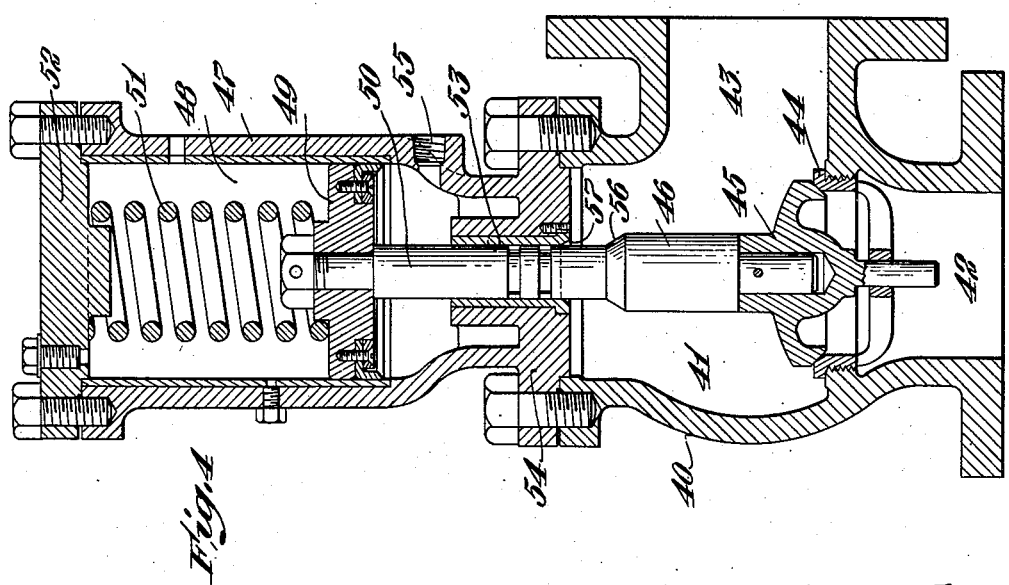

2,206,957

UNITED STATES PATENT OFFICE 2,206,957

POWER OPERATED VALVE SYSTEM

Alexander V. Hose, Marblehead, Mass., assignor to Atwood & Morrill Co., Salem, Mass., a corporation of Massachusetts Application July 1, 1939, Serial No. 282,487

5 Claims. (Cl. 137—144)

This invention relates to an improvement in power operated valve systems, and more particularly to the provision of dual control means whereby valves may be operated either at or adjacent the valves or remote from the valves at any desired point, the operation of either control being independent of the other control and the setting of either control rendering inoperative the other control.

On field in which this invention is of value is that of ships wherein numerous valves are installed in the holds, engine rooms, machinery spaces or shaft alleys, many of which valves are in more or less inaccessible positions. While the following description and accompanying drawings relate to the use of the invention in that field, it will be understood that the invention is not restricted or limited to that field but is of general application.

It has been found of great advantage to supplement local valve control means with remote valve control means, but in many instances the weight, length and frictional resistance of the elements employed are such that it is difficult to operate the valve from the remote control means and the elements of the remote control means so interfere with the operation of the local control means that the operator at the valve frequently disconnects such elements so that in case of an emergency the remote control means cannot be operated.

In Patent No. 1,970,963, dated August 21, 1934, is disclosed a system comprising a valve having a stem by the reciprocation of which the valve is opened or closed, such reciprocation being controlled either by hand, i. e. local control, or by a fluid pressure pump which responds to means at any desired location, i. e. remote control means. The present invention is a further development of the invention disclosed in that patent but attains the result in a much simpler and yet more efficient manner.

The primary object of this invention is to provide a system which embodies a valve operated by fluid pressure and actuated either by local control means or by remote control means.

A further object of the invention is to provide in such a system a master control means located preferably adjacent the remote control means by which either the local control means or the remote control means may be set for operation, the setting for either such control means rendering the other control means inoperative.

Further objects of this invention reside in the provision in association with each valve of a transfer unit which responds to the operation of either control means; in the structure of such transfer valve; and in the structure of the power-operated valve.

These and other objects will appear from a consideration of the following description taken in conjunction with the accompanying drawings, wherein:

Fig. 1 illustrates schematically a system embodying this invention;

Fig. 2 is a detail view in cross section of one type of master control cock suitable for use in this system;

Fig. 3 is a sectional view of one of the transfer units of that system;

Figs. 4 and 5 illustrate in section two of the types of valves suitable for incorporation in the system shown in Fig. 1; and Fig. 6 is a sectional view similar to Fig. 3 of another form of transfer unit.

The system embodying this invention illustrated in Fig. 1 is intended for installation in a ship whereby a plurality of valves 10 operated by fluid pressure in the hold of the ship may be opened or closed either by local control cocks 11 or by remote control cocks 12, the control cock to be employed being determined by a master control cock 13. The fluid, such as compressed air, water, steam or the like, by which the valves 10 are operated, is supplied to the system through a main feed 14 leading to the master control cock 13, from which lead headers 15 and 16. Branches 17 connect the header 15 with the local control cocks 11 and runs 18 lead from the control cocks 11 to transfer units 20, each unit being connected to a valve 10 by a pipe 21. Similarly the remote control cocks 12 are connected to the header 16 by branches 23 and to the transfer units 20 by runs 24.

The master control cock 13 may be of any well known or desired type. For example (see Fig. 2), it may be of the four-way type wherein a handle 25 determines the header 15 or 16 with which the main feed 14 is connected and simultaneously connects the other header with an outlet vent 26.

The purpose of the transfer unit 20 is to direct the fluid supplied by either run 18 or 24 to the pipe 21 and the valve 10 associated therewith, thereby operating the valve, i. e. opening it if it be normally closed or closing it if it be normally open.

The transfer unit 20 comprises a casing 30 surrounding a valve chamber 31. Ports 32 and 33 lead through said casing at each end of the valve chamber. A port 34 leads through the the casing midway between the ends of the valve chamber. The ports 32 and 33 are provided with valve seats 35 and 36, respectively. Reciprocable within the chamber 31 is a valve 37 of the shuttle stemless type. This valve is generally cylindrical in form and provided at each end with a conical surface 38 adapted to engage said valve seats 35 or 36 and seal off the port thereof. The chamber 31 has a cylindrical wall with which the valve 37 is in contact to prevent the passage of fluid therebetween. As shown in Fig. 3 the dimensions of the elements are such that when the valve 37 is in engagement with the valve seat of either port 32 or 33, a free passage is provided between the other port and the port 34.

The valve 10 is of either the normally closed type or the normally open type. Examples of each type are shown in Figs. 4 and 5. The normally closed valve (Fig. 4) comprises a casing 40 having a valve chamber 41 provided with ports 42 and 43 and a valve seat 44 engaged by the head 45 of a plunger type of valve 46. Mounted upon and fixed to the valve casing 40 is a piston casing 47 having a chamber 48 in which reciprocates a piston 49 secured to the stem 50 of the valve 46. A spring 51 bearing upon the piston 49 and the cover plate 52 of the chamber 48 normally holds the valve head 45 in engagement with the seat 44, thus closing the port 42. The stem 50 passes through a bushed passage 53 in the base 54 of the casing 47. The pressure fluid enters the piston chamber 48 below the piston 49 through a port 55 from the pipe 21 and opens the valve against the normal action of the spring 51. Upon the stem 50 is mounted a collar 56 having a conical upper edge which engages a seat 57 in the bushing to seal off the passage 53 when the valve is open and to prevent the escape of the pressure fluid from the piston chamber 48.

The normally open valve (Fig. 5) is similar in many respects to the normally closed valve (Fig. 4) and hence the corresponding elements will be designated and referred to by the same reference characters without further description. In this valve the spring 51 surrounds the stem 50 and bears against the piston 49 and the base 54 and the fluid under pressure in the pipe 21 enters the piston chamber 48 through a port 58 in the cover plate 52 to close the valve against the normal urge of the spring 51.

The operation of the system illustrated in Fig. 1 will be described. The master control cock 13 is set so that the local control header 15 is connected with the main feed 14 while the remote control header 16 is connected to the outlet vent 26. Hence the valves 10 may be opened or closed, depending upon their type or function, by the operation of the local control cocks 11, admitting the fluid under pressure in the header 15 through the branch 17, valve 11, run 18, transfer unit 20, and pipe 21 to the piston chamber of the valve. The shuttle 31 not only moves under the application of pressure to allow the fluid to enter the pipe 21 but also seals off the run 24 so that there will be no loss in pressure. The valve 10 remains in such position so long as the local control cock 11 is thrown, but upon the return of the cock 11 to its normal inoperative position the valve under the impulse of the spring 51 resumes its normal position.

Should an occasion arise which renders it of advantage to operate the valves 10 from the remote control cocks 12, the handle 25 of the master control cock 13 is moved counterclockwise until the main feed 14 is connected to the remote control header 16 and the local control header 15 connected to the outlet vent 26. Thereafter the throwing of any control cock 12 admits fluid under pressure from the header 16 through branch 23, cock 12, run 24 to the transfer unit 20 (shifting the shuttle 31 into engagement with the seat 33 to seal off the run 18) and thence through the pipe 21 to operate the valve 10.

From the above description it will appear that the selective setting of the control cocks (either local or remote) is determined by the master control cock 13, which is preferably located as shown in Fig. 1 adjacent the remote control cocks. It will be noted that when either group of cocks has been selected the cocks of the other group are entirely inoperative; that the only elements common to both controls are the transfer unit 20 and pipe 21; that the shuttle 31 of the transfer unit 20 is the only element, except the valve 10, moved by any control cock and that the operation of the valve 10 by both controls is the same.

Fig. 6 illustrates another type of transfer unit which might be substituted for the unit 20 previously described, to carry out the same function. This alternate unit 60 comprises a casing 61 having a valve chamber 62 and a piston chamber 63. The runs 18 and 24 and the pipe 21 are connected to the valve chamber 62 through ports 64, 65 and 66, respectively. The ports 64 and 65 are adjacent the ends of the chamber 62 and are provided with valve seats 67 and 68, respectively, adapted to be engaged by the head 69 of a valve 70 reciprocable in the valve chamber 62. The valve 70 also includes a stem 71 which extends through a passage 72 in a septum 73 which separates the valve and piston chambers. Carried by the stem 71 is a piston 74. Surrounding the stem is a spring 75 which bears upon the septum 73 and piston 74 and normally tends to move the valve to the right. The piston chamber is connected through a port 76 and pipe 77 with the header 15. The unit is shown in the position taken when fluid pressure is set up in such header to move the valve to the left against the urge of the spring 75, so that the port 65 is sealed and the ports 64 and 66 are connected.

If the transfer unit 60 be substituted for the unit 20 the operation of the local and remote cocks is not affected. However, with such a unit the remote control elements are normally set by the action of the spring 75 which causes the valve head 69 to seal off the run 18 and to connect the run 24 with the pipe 21. When, however, the local control cocks are selected by the master control cock the fluid under pressure in the header 15 acts through the pipe 77 to shift the valve 70 so that the run 24 is sealed off and the run 18 is connected to the pipe 21.

While certain embodiments of this invention have been shown and described, it will be understood that the invention is not limited thereto and that other embodiments may be made without departing from the spirit and scope of this invention.

I claim:

1. A valve system comprising a plurality of valves operated by fluid pressure, a group of local control cocks, a group of remote control cocks, one cock of each group being associated with each valve and adapted to control the supply of operating fluid thereto, and means for selectively supplying such operating fluid to the cocks of one group only and for preventing the supply of such fluid to the cocks of the other group.

2. A valve system comprising a plurality of valves operated by fluid pressure, a group of local control cocks, a group of remote control cocks, one cock of each group being associated with each valve and adapted to control the supply of operating fluid thereto, means for supplying such operating fluid to the system, and means for selectively conducting such fluid to the valves through the cocks of one group to the exclusion of the cocks of the other, whereby the operation of the valves is controlled solely by the cocks of the first-named group.

3. A valve system comprising a plurality of valves operated by fluid pressure, a transfer unit associated with each valve and through which the operating fluid passes to the valve, a group of local control cocks, a group of remote control cocks, one cock of each group being associated with each unit and controlling the feeding of such operating fluid thereto, means for supplying such operating fluid to the system, and means for selectively determining the group of cocks through which such fluid is fed to the transfer units and for preventing the supply of such fluid to the cocks of the other group, whereby the cocks of such first-named group control the feeding of the fluid to the valves and the operations thereof.

4. A valve system comprising a plurality of valves operated by fluid pressure, a transfer unit associated with each valve, a pipe through which the operating fluid passes from the transfer unit to the valve associated therewith, a group of local control cocks, a group of remote control cocks, one cock of each group being associated with each transfer unit, runs connecting each cock with the transfer unit associated therewith, a main feed through which such fluid is supplied to the system, a master control cock, headers leading from said master control cock, one header associated with each group of control cocks, branches connecting each cock with the header of its group, said master control cock selectively determining the header through which such operating fluid shall pass and preventing the passage of such fluid to the other header, whereby the flow of such operating fluid to the transfer units and thence to the valves is controlled solely by the group of control cocks associated with said first-named header.

5. A valve system comprising a plurality of valves operated by fluid pressure, a transfer unit associated with each valve, a pipe through which the operating fluid passes from the transfer unit to the valve associated therewith, a group of local control cocks, a group of remote control cocks, one cock of each group being associated with each transfer unit, runs connecting each cock with the transfer unit associated therewith, a main feed through which such fluid is supplied to the system, a master control cock, headers leading from said master control cock, one header associated with each group of control cocks, branches connecting each cock with the header of its group, and an outlet vent from said master control cock to the atmosphere, said master control cock selectively determining the header through which such fluid shall pass and connecting the other header to the atmosphere, whereby the flow of such fluid to the transfer units and thence to the valves is controlled solely by the group of control cocks associated with said first-named header.

ALEXANDER V. HOSE.